United States Patent [19]

Perez

[11] Patent Number: 4,485,799
[45] Date of Patent: Dec. 4, 1984

[54] DUAL BURNER GAS GRILL ALIGNMENT DEVICE

[76] Inventor: Manuel Perez, 11204 Hidden Valley, Tampa, Fla. 33624

[21] Appl. No.: 543,628

[22] Filed: Oct. 20, 1983

[51] Int. Cl.³ ............................ F24C 3/00; F23Q 9/00
[52] U.S. Cl. ................................ 126/39 E; 126/41 R; 126/25 R; 431/278
[58] Field of Search ..................... 126/50, 41 R, 25 R, 126/39 E, 40, 39 H; 431/278, 354, 154

[56] References Cited

U.S. PATENT DOCUMENTS

| 4,267,816 | 5/1981 | Koziol | 126/41 R |
| 4,356,810 | 11/1982 | Ferlin | 126/41 R |
| 4,373,505 | 2/1983 | Koziol | 126/41 R |

Primary Examiner—Samuel Scott
Assistant Examiner—G. Anderson
Attorney, Agent, or Firm—A. W. Fisher, III

[57] ABSTRACT

An alignment device for use with a dual burner gas grill including a pair of gas supply tubes affixed to a burner element each having a venturi tube telescopingly disposed therein movable between an extended and retractable position, the venturi tubes being disposed in substantially parallel spaced relationship relative to each other, the alignment device comprising a base plate attached to the periphery of the venturi tubes including an alignment element inclined inwardly relative to the longitudinal axes of the venturi tubes to engage each of the dual venturi tubes to maintain parallel relationship relative to each other during movement between the extended and retracted position and a securing element comprising a first locking member coupled to the base plate and a second locking member coupled to the gas supply tubes to selectively engage each other to secure the venturi tubes in the extended position.

3 Claims, 4 Drawing Figures

DUAL BURNER GAS GRILL ALIGNMENT DEVICE

BACKGROUND OF THE INVENTION

1. Field of the Invention

An alignment device for use with a dual burner gas grill configured to maintain a pair of adjustable dual venturi tubes in parallel relationship relative to each other.

2. Description of the Prior Art

A number of different designs and configurations for gas grills have been developed. Gas grills are often arranged to uniformally heat over the entire area of the grill enclosure. This is desirable when each piece of food or all portions of a large portion of food will receive an equal amount of heat rendering it unnecessary to shift the pieces or piece during cooking. Unfortunately in larger grills, there may be a need to operate different areas on the grill at different temperatures. To accomplish this, various split or dual gas burners have been developed. Examples of such prior art are disclosed in U.S. Pat. No. 3,638,635 and U.S. Pat. No. 4,092,975.

In addition, various attempts have been undertaken to provide a universal burner element for gas grills to accommodate gas grills of various sizes. In order to provide this, such structures have included adjustable and telescoping gas intake/venturi tube assemblies for the gas grill. An example of such prior are is disclosed in U.S. Pat. No. 4,267,816.

Unfortunately when combining a dual or split burner with an adjustable gas intake tube/venturi assembly there is a substantial danger or hazard in not having each of the dual gas intake/venturi assemblies properly seated on the dual gas supply nozzles. Thus there is a significant need for maintaining the dual gas intake/venturi assemblies in parallel relationship relative to each other.

SUMMARY OF THE INVENTION

The present invention relates to an alignment device for use with a dual burner grill wherein the burner grill comprises a burner element to which a pair of gas burner assemblies is operatively attached. Each gas burner assembly comprises a gas supply tube having a venture tube telescopingly disposed therein. The alignment device comprises a face plate affixed to the periphery of the venturi tubes and extending therebetween. An alignment element is inclined inwardly relative to the longitudinal axes of the venturi tubes to engage the sides of the venturi tubes and maintain them in fixed spaced relation relative to each other.

In addition, a securing element comprising a first and second locking member coupled to the base plate and gas supply tubes respectfully to operatively engage each other to secure the venturi tubes longitudinally relative to the corresponding gas supply tube in one of a range of preselected position.

In use, the first locking member is moved out of operative engagement to the second locking member to permit the venturi tubes to be telescopingly moved relative to the corresponding gas supply tubes. When the appropriate overall vertical dimensions of the gas supply tubes and corresponding venturi tube is locked the first locking member is permitted to engage the second locking member to securely lock the corresponding gas supply tube and venturi tube in place.

The invention accordingly comprises the features of construction, combination of elements, and arrangement parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
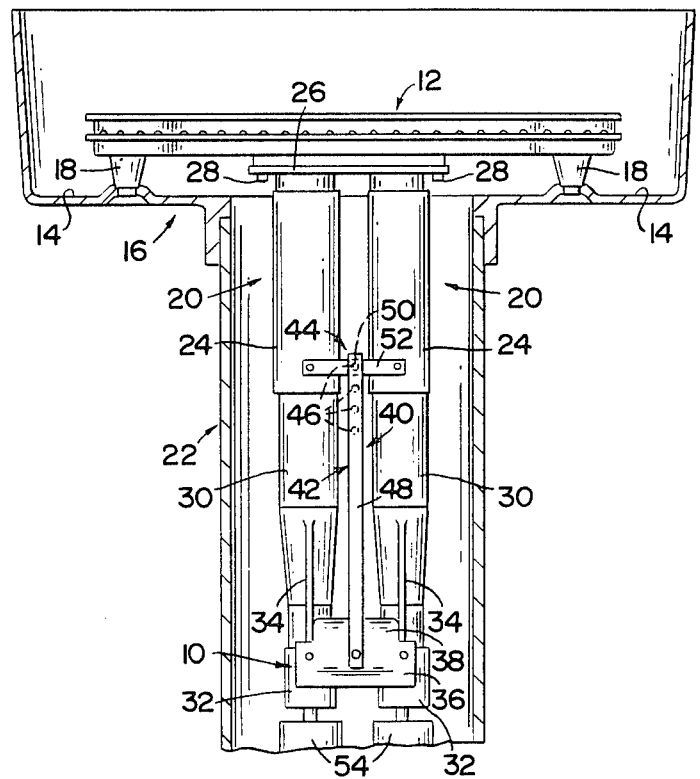
FIG. 1 is a view of the alignment device in place with a dual burner gas grill.

As shown in FIG. 1, the present invention relates to an alignment device generally indicated as 10 for use with a dual burner gas grill. The dual burner comprises a burner element generally indicated as 12 is supported in fixed spaced ralation relative to the floor 14 of the barbeque grill generally indicated as 16 by a plurality of support members each indicated as 18. A pair of gas burner assemblies each generally indicated as 20 are operatively disposed within a substantially vertical standard or the like generally indicated as 22. Each gas burner assembly 20 comprises a gas supply tube 24 affixed to a mounting plate 26 which is in turn fastened to the burner element 12 by fasteners 28. Operatively disposed within each of the gas supply tubes 24 in telescoping relationship thereto is a corresponding venturi tube 30 having an adjustable air regulator 32 operatively attached to the outer end thereof. A rib 34 is formed longitudinally on the outer surface or side portions of each venturi tube 30. The venturi tubes 30 are provided in telescoping fashion relative to the corresponding gas supply tube 24 in order to accommodate gas grills of various vertical dimensions.

Figure 2:
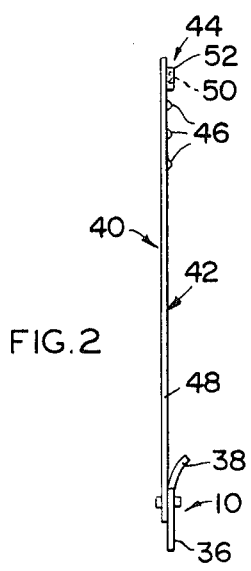
FIG. 2 is a side view of the alignment device.

As shown in FIGS. 1 and 2, the alignment device 10 comprises a base plate 36 affixed to the periphery of the venturi tubes 30 through the adjustable air regulator 32 and extending therebetween. An alignment element 38 inclined inwardly relative to the longitudinal axes of venturi tubes 30 is formed on the inner periphery of the base plate 36 to engage the sides of the venturi tubes 30 and maintain them in fixed spaced relationship relative to each other as the venturi tubes 30 are telescoped relative to the corresponding gas supply tubes 24. As shown in the preferred embodiment, the alignment element 38 engages ribs or side portions 34. In order to secure the dual venturies 30 longitudinally relative to the gas supply tubes 24, a securing element generally indicated as 40 is provided. The securing element 40 comprises a first locking member generally indicated as 42 coupled to the base plate 36 and a second locking member generally indicated as 44 coupled to the gas supply tubes 24 to selectively engage each other to secure the venturi tubes 30 in a preselected position.

The first locking member 42 comprises at least one protrusion 46 coupled to the base plate 36 by an elongated flexible interconnecting member 48. To provide various intermediate positions between the fully retracted and extended position a plurality of protrusions 46 may be formed along the elongated flexible interconnecting member 48. The second locking member 44 comprises an aperture 50 formed on cross member 52 extending between the pair of gas supply tubes 24. The aperture 50 is provided to selectively receive the protrusions 46 to secure the pair of venturi tubes 30 in longitudinal position relative to the corresponding pair of gas supply tubes 22.

Figure 3:
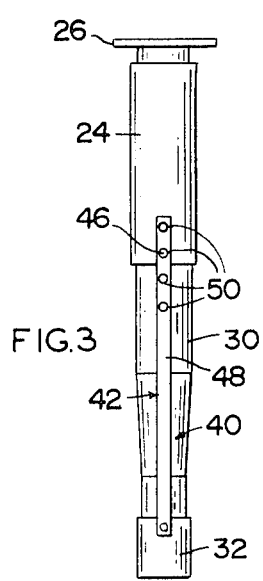
FIG. 3 is a front view of an alternate embodiment of the alignment device in combination with a gas burner assembly.
Figure 4:
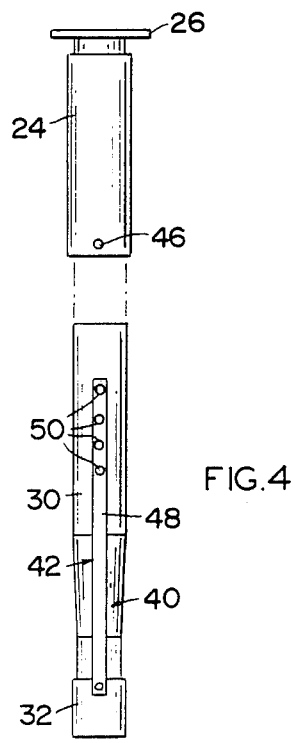
FIG. 4 is a front exploded view of the alternate embodiment of the alignment device.

FIG. 3 shows an alternate embodiment of the securing element 40 wherein the elongated flexible interconnecting member 44 is attached directly to the venturi tube 30 and the protrusion 46 is formed directly on the gas supply tube 24 itself to selectively receive one of a plurality of apertures 50.

In use the first locking member 42 is moved out of operative locking relationship relative to the second locking member 44 to permit the venturi tubes 30 to be telescopingly moved relative to the gas supply tubes 24 in order that the venturi tubes 30 may be adjusted to fit over the gas supply nozzles 54 to permit fluid communication between a gas source (not shown) and the burner element 12. The resilence of the elongated flexible interconnecting member 48 permits release thereof causing the appropriate protrusion or pin 46 to operatively engage the aperture 50 to secure the venturi tubes 30 longitudinally relative to the gas supply tubes 24. During this adjustment the alignment element 38 engaging the sides of the venturi tubes 30 maintain their parallel relationship relative to each other thus preventing any misalignment of the air regulators 32 relative to the gas supply nozzles 54.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,

What is claimed is:

1. An alignment device for use with a dual burner gas grill wherein the gas grill includes a pair of gas supply tubes affixed to a burner element, each said gas supply tube having a venturi telescopingly disposed therein movable between a fully extended and fully retracted position, said venturi tubes being disposed in substantially parallel relationship relative to each other; said alignment device comprising a base plate coupled on opposite end portions thereof to the periphery of said venturi tubes, said base plate having an alignment element included inwardly relative to the longitudinal axes of said venturi tubes to engage the side portions of said dual venturi tubes to maintain the spacing between said dual venturi tubes during movement between said fully extended and fully retracted positions and a securing element comprising a first locking member including at least one protrusion coupled to said base plate by an elongated flexible interconnecting member and a second locking member including an aperture formed on a cross member extending between said gas supply tubes, said aperture being disposed to selectively engage said protrusion to secure said venturi tubes in longitudinal position relative to said gas supply tubes.

2. The alignment device of claim 1 wherein said venturi tubes each includes at least one rib formed longitudinally on the lower portion thereof to engage said alignment element.

3. The alignment device of claim 1 wherein said first locking member includes a plurality of protrusions formed longitudinally along said elongated flexible interconnecting member to provide selectively intermediate positions between said fully retracted and fully extended position.

* * * * *